Sept. 19, 1950 U. PIANTA ET AL 2,523,231
MECHANISM FOR TRANSFORMING CONTINUOUS ROTARY
MOTION INTO RECIPROCATING MOTION
Filed Feb. 21, 1949
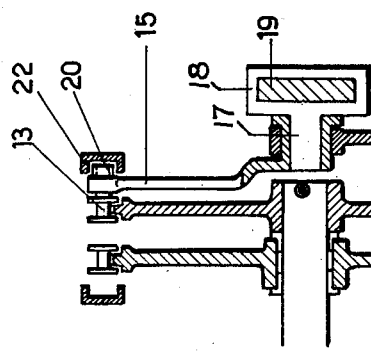
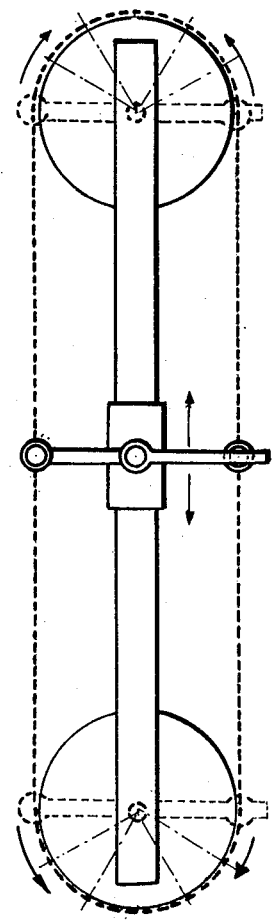
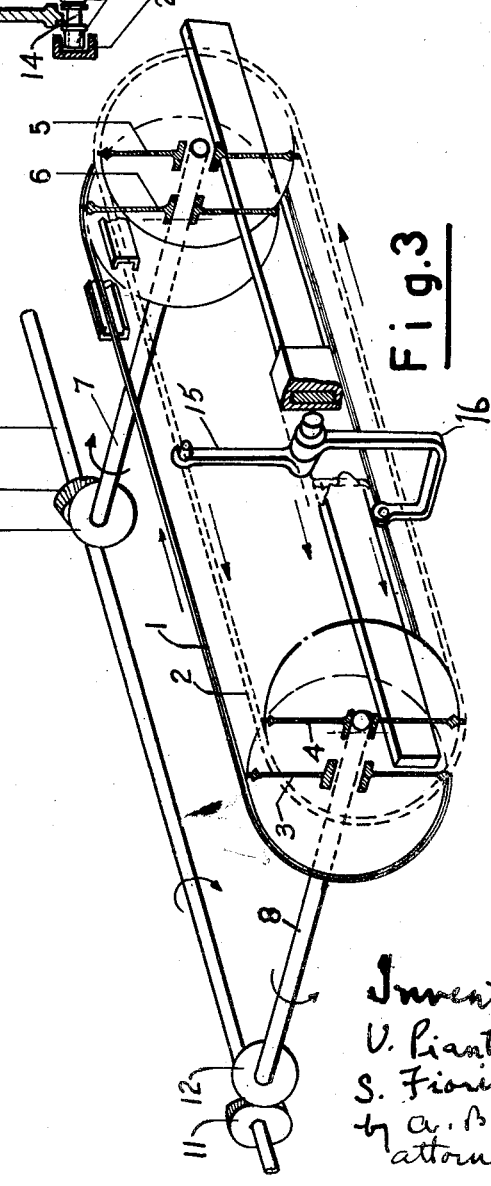
Inventors
U. Pianta
S. Fiorini
by a. B. Tooker
attorney.

Patented Sept. 19, 1950

2,523,231

UNITED STATES PATENT OFFICE 2,523,231

MECHANISM FOR TRANSFORMING CONTINUOUS ROTARY MOTION INTO RECIPROCATING MOTION

Ubaldo Pianta, Milan, and Sestilio Fiorini, Brescia, Italy, assignors to Società Italiana Ernesto Breda Per Costruzioni Meccaniche, Milan, Italy, a firm Application February 21, 1949, Serial No. 77,656
In Italy March 18, 1948

2 Claims. (Cl. 74—37)

The present invention relates to a mechanism, by means of which a continuous rotary motion, which may be a uniform motion, can be used as a drive for a rectilinear reciprocating motion interrupted by long lasting rest periods at the end of each stroke. Devices of that kind may find application in several machines and are particularly useful for straight bar knitting machines, with special reference to those for stockings and the like of the "Cotton" type, which need a long lasting stage at nul velocity at the inversion points of the reciprocating movement.

The accompanying drawing represents by way of example and without limiting the scope of the invention, one embodiment of the mechanism, which may be put into practice in several forms without departing from the scope of the invention.

Figures I, II, and III represent the front view, the cross-section and a perspective view respectively of the mechanism.

As it appears from the drawing, the mechanism comprises two continuous chains numbered 1 and 2, winding on the sprockets 3, 4, 5 and 6. 4 and 6 are the driving sprockets and receive motion from the shafts 7 and 8 by means of the pinions 9, 10 and 11, 12. As clearly appears from the drawing, the driving sprockets 4 and 6 turn in opposite relative directions. On the chains 1 and 2 there are hinged the connecting rods 15 and 16 by means of the pins 13 and 14. The rods 15 and 16 are hinged to each other by means of the pin 17 which is rigidly connected to the slide 18 sliding on the guide 19. The rods 15 and 16 have a length equal to the radius of the sprockets 3, 4, 5 and 6, which are all equal to one another in diameter. The sprockets 3 and 5 are loose on their journals.

The operation of the above mechanism is evidently as follows:

The driving shaft 24 rotates the shafts 7 and 8, by means of the pinions 9, 10 and 11, 12, with opposite directions and, therefore, also the driving sprockets 6 and 4, which transmit the continuous motion to the chains 1 and 2. These chains will evidently move in opposite directions relative to each other. The sprockets 5 and 3 are loose.

As the chains move in opposed directions, they drag in a concurrent direction the slide 18 sliding on the guide 19 (owing to the connection of the rods as clearly shown in the drawing). If the centre of the pin 17 coincides (at the end of a stroke) with the centre of the axis of the sprockets dragging the chain, the slide 18 will remain at nul velocity for a period corresponding to the rotation of the rods along the arc through which the chains engage the driving or driven sprockets (3, 4, 5 and 6), such arc being 180°.

In order to prevent variations of movement due to the flexibility of the chains, the mechanism is provided with guides 22 and 23 in which there are sliding rolls 20 and 21 mounted on pins 13 and 14 of the rods 15 and 16.

Having now particularly described and ascertained the nature of our said invention and in what manner the same is to be performed, we declare that what we claim is:

1. A device for transforming a continuous rotary motion into a rectilinear reciprocating motion, comprising two endless chains arranged in parallel planes and stretched between two pairs of equal diameter and coaxial sprockets rotating in opposite directions, a guide in the plane of the axes of the said sprockets, a member slidable along said guide, two connecting rods loosely pivoted on said member and having an effective length equal to the radius of said sprockets, the free ends of said connecting rods being hinged to the said two chains respectively by two hinges which in their movement simultaneously intersect the plane of the said axes.

2. A device according to claim 1, comprising guide means for said hinges.

UBALDO PIANTA.
SESTILIO FIORINI.

REFERENCES CITED

The following references are of record in the file of this patent:

UNITED STATES PATENTS

| Number | Name | Date |
|---|---|---|
| 1,756,089 | Hunter | April 29, 1930 |